(12) United States Patent
Burgess

(10) Patent No.: US 11,520,966 B2
(45) Date of Patent: Dec. 6, 2022

(54) AUTOMATED ASSISTED CIRCUIT VALIDATION

(71) Applicant: Tektronix, Inc., Beaverton, OR (US)

(72) Inventor: David Everett Burgess, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 17/370,976

(22) Filed: Jul. 8, 2021

(65) Prior Publication Data
US 2022/0012397 A1     Jan. 13, 2022

Related U.S. Application Data

(60) Provisional application No. 63/050,053, filed on Jul. 9, 2020.

(51) Int. Cl.
*G06F 30/367*     (2020.01)
*G06F 30/3953*     (2020.01)
(Continued)

(52) U.S. Cl.
CPC ..... *G06F 30/367* (2020.01); *G01R 31/31835* (2013.01); *G01R 31/318357* (2013.01);
(Continued)

(58) Field of Classification Search
CPC .................................................. G06F 30/367
(Continued)

(56) References Cited

U.S. PATENT DOCUMENTS 6,671,846 B1 *    12/2003    Schultz ................. G06F 11/261
                                                                           716/108
8,769,360 B2      7/2014    Motika et al.
(Continued)

FOREIGN PATENT DOCUMENTS

KR    10-2012-0047336      5/2012
KR    10-2020-0001517      1/2020

OTHER PUBLICATIONS

Korean Intellectual Property Office, International Search Report and Written Opinion for International Application PCT/US021/040965, dated Oct. 29, 2021, 8 pages, Daejeon, Republic of Korea.

*Primary Examiner* — Eric D Lee
(74) *Attorney, Agent, or Firm* — Miller Nash LLP; Andrew J. Harrington

(57) ABSTRACT

A method comprising categorizing nodes of a fabricated circuit as being priority nodes and nodes as being inferior nodes; evaluating a first priority node by automatically designating for verification the first priority node, and ascertaining whether a measured signal from the first priority node meets a pass-fail criterion for the first priority node; evaluating, when the measured signal from the first priority node meets the pass-fail criterion, a second priority node by automatically designating for verification the second priority node, and ascertaining whether a measured signal from the second priority node meets a pass-fail criterion for the second priority node; and evaluating, when the measured signal from the first priority node does not meet the pass-fail criterion, a first inferior node, by automatically designating for verification the first inferior node, and ascertaining whether a measured signal from the first inferior node meets a pass-fail criterion for the first inferior node.

23 Claims, 5 Drawing Sheets

(51) Int. Cl.
*G06F 30/398* (2020.01)
*G06F 30/323* (2020.01)
*G06F 30/333* (2020.01)
*G06F 30/3308* (2020.01)
*G01R 31/3183* (2006.01)
*G06F 119/02* (2020.01)

(52) U.S. Cl.
CPC .......... *G06F 30/323* (2020.01); *G06F 30/333* (2020.01); *G06F 30/3308* (2020.01); *G06F 30/398* (2020.01); *G06F 30/3953* (2020.01); *G06F 2119/02* (2020.01)

(58) Field of Classification Search
USPC ........................................................ 716/111
See application file for complete search history.

(56) References Cited

U.S. PATENT DOCUMENTS

| | | |
|---|---|---|
| 2008/0201624 A1 | 8/2008 | Kim et al. |
| 2015/0123696 A1 | 5/2015 | Bhogela et al. |

\* cited by examiner

AUTOMATED ASSISTED CIRCUIT VALIDATION

CROSS-REFERENCES TO RELATED APPLICATIONS

This patent application claims the benefit of provisional Application No. 63/050,053 filed Jul. 9, 2020. That application is incorporated into the present disclosure by this reference.

TECHNICAL FIELD

The subject matter is related to a system and methods for validating and debugging electronic circuits.

BACKGROUND

Previously, to verify and debug an electronic circuit, a designer needed to design the circuit, simulate it, and build the circuit. Once the circuit is built, the designer needs to validate the circuit's operation. In many cases, there is some portion of the circuit that does not work as expected. In these cases, the designer or a highly experienced technician needs to analyze the circuit and determine through educated trial and error what portion of the circuit is malfunctioning or has a defect in it. This requires a high level of familiarity with the circuit and its intended operation.

Configurations of the disclosed technology address shortcomings in the prior art.

DETAILED DESCRIPTION

Figure 1:
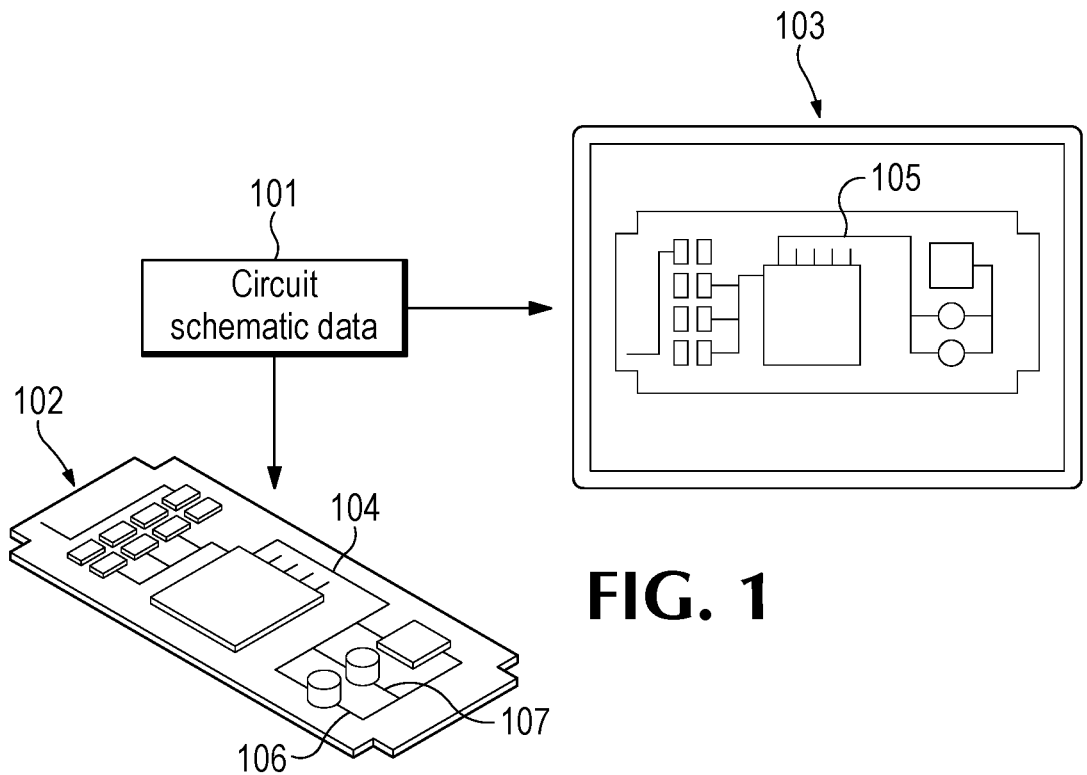
FIG. 1 illustrates an example relationship between circuit schematic data, circuit simulation data, and a fabricated circuit.

As described herein, aspects are directed to methods for automated assisting of circuit validation. Configurations allow a human operator to validate the circuit, even when the operator does not have a high level of familiarity with the circuit or its intended operation. Hence, the described system may automatically choose the nodes to be tested, based on a hierarchy of test nodes, branch analysis, artificial intelligence, or other suitable means.

Accordingly, configurations apply machine learning or an automatically generated diagnostic tree, as examples, to the process of validating a circuit's operation. Aspects of the disclosed technology take the circuit schematic and associated network node list, apply algorithmic analysis, and guide the process of checking the operation of the circuit, node by node. Configurations use expected waveforms and measured waveforms at various locations in the schematic circuit and in the associated fabricated circuit to determine if the circuit is producing the desired signal at key locations. Depending on the measured network node and the result of the measurement, the algorithm would suggest a new point in the circuit to measure or test. This process could be repeated until either the circuit operation is validated as having proper operation of all portions of the circuit or a faulty component or manufacturing flaw is isolated to the most likely location.

In configurations, the schematic of the circuit is modeled to obtain expected signals at key points in the circuit and to determine what the proper operation of the circuit would look like. In the exhaustive case, every network node in the schematic would have a simulated signal generated for it. The schematic would then be analyzed using branch analysis or suitable artificial intelligence approaches to identify an appropriate sequence of verifying circuit network nodes to determine proper circuit operation when compared with the simulated operation. This analysis may be applied as a batch process at the beginning of the circuit verification or it may be applied as each node is evaluated to determine the next location to verify. The goal of the process is to get a circuit that operates within an acceptable tolerance to the level that the simulated model predicted.

As the circuit is evaluated and good and bad signals are identified, failing components or network nodes would be further analyzed to identify the most likely failure. For example, a signal is present at the input of an active device and is not present at the output and power to the active device is present. Then this device or the network node connected to its output would be identified as the most likely failure location. If all of the circuit is verified with signals within tolerance, then the circuit would be considered verified.

By automating the process of analyzing the circuit and comparing real-life signals to modeled signals, the process for verifying circuit operation or isolating the fault location can be simplified and accelerated. Accordingly, the circuit may be validated even by an operator that does not have a high level of familiarity with the circuit or its intended operation.

FIG. 1 illustrates an example relationship between circuit schematic data 101, circuit simulation data 103, and a fabricated circuit 102. As illustrated, the circuit schematic data 101 may be generated by, for example, a circuit designer, and the circuit schematic data 101 specifies the functional features of the desired fabricated circuit 102. The circuit schematic data 101 may also be used to generate the circuit simulation data 103 (illustrated in FIG. 1 as appearing on an example display screen). For example, the circuit schematic data 101 may be captured and modeled by a computer-aided analysis tool 202 such as a circuit simulation software, to produce the circuit simulation data 103. The circuit simulation data 103 exists as mathematical modeling in computer software and models the function of the physical, fabricated circuit 102 or portions of the fabricated circuit 102. Accordingly, the circuit simulation data 103 may include simulated signals for nodes 105 of the circuit simulation data 103 that correspond to nodes 104 of the fabricated circuit 102.

These simulated signals within the circuit simulation data 103 represent the expected signals for the corresponding nodes 104 of the fabricated circuit 102. Accordingly, these expected signals may be the bases for pass-fail criteria for the corresponding nodes 104 of the fabricated circuit 102. For example, a given measured signal may meet the pass-fail criterion for the respective node if it matches, or falls within a desired tolerance of, the expected signal for that node.

Likewise, the given measured signal may fail to meet the pass-fail criterion for the respective node if it does not match, or falls outside of the desired tolerance of, the expected signal for that node.

Figure 2:
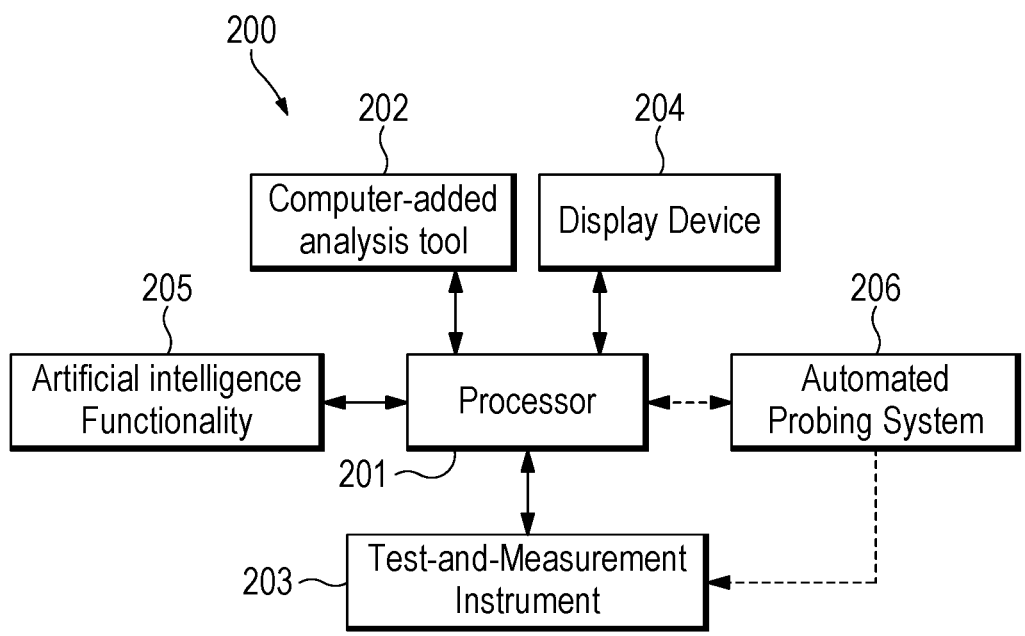
FIG. 2 is a functional block diagram of an example configuration of components of a system configured for automated assisting of circuit validation.

FIG. 2 is a functional block diagram of an example configuration of components of a system 200 configured for automated assisting of circuit validation. As illustrated, the system may include a processor 201, a computer-aided analysis tool 202, a test-and-measurement instrument 203, a display device 204, an artificial intelligence functionality 205, and an automated probing system 206, each as described elsewhere in this disclosure.

Figure 3:
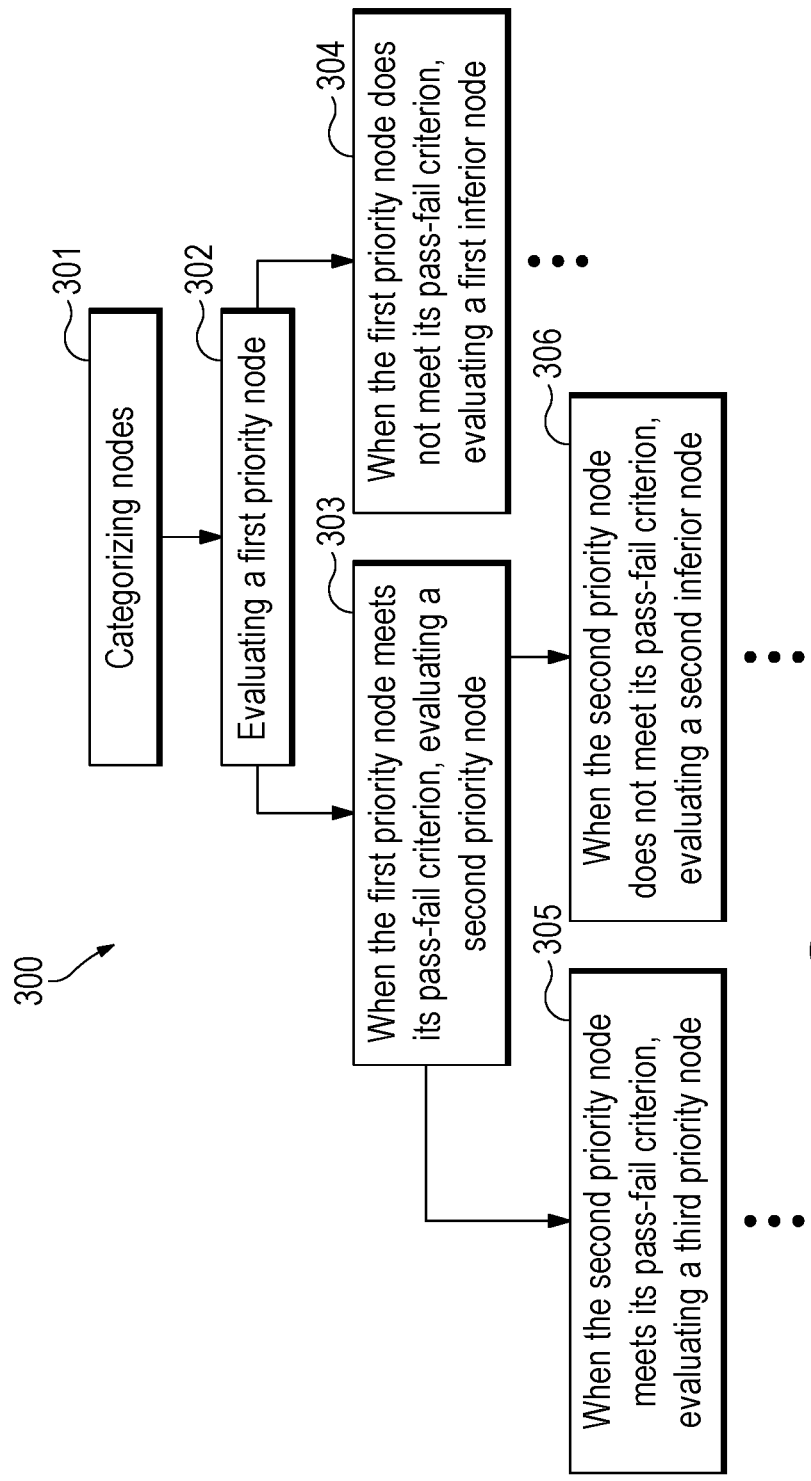
FIG. 3 illustrates aspects of an example method for automated assisting of circuit validation, according to an example configuration.

FIG. 3 illustrates an example method 300 for automated assisting of circuit validation, according to an example configuration. As illustrated in FIG. 3, a method for automated assisting of circuit validation may include categorizing 301 one or more nodes 104 of a fabricated circuit 102 as being a priority node and one or more nodes 104 of the fabricated circuit 102 as being an inferior node. Each inferior node is on a same sub-portion of the fabricated circuit 102 as at least one of the priority nodes. In this context, being "on" a same sub-portion of the fabricated circuit means being logically or functionally related to the same sub-portion of the fabricated circuit, but not necessarily physically adjacent or close to the same sub-portion of the fabricated circuit. Hence, for example, the priority nodes may be nodes for distinct functional areas of the fabricated circuit 102, while the inferior nodes may be nodes within the circuit branches of the respective functional area. In configurations, an inferior node feeds into the corresponding priority node. For example, as illustrated in FIG. 1, the node 104 is an example of a priority node, while the node 106 and the node 107 are examples of inferior nodes.

In configurations, there may be a hierarchy among the priority nodes. For example, key portions of the fabricated circuit 102 that are fundamental to the majority of the fabricated circuit's operation may be designated as a higher-value priority node, while signal paths may be designated as a lower-value priority node. In configurations, this information may be used to generate a diagnostic tree or provided to an artificial intelligence functionality, as discussed below.

Returning to FIG. 3, the method 300 for automated assisting of circuit validation may further include evaluating 302 a first priority node by automatically designating for verification the first priority node from the priority nodes categorized at the process labeled 301, and then ascertaining whether a measured signal from the first priority node meets a pass-fail criterion for the first priority node. For example, processes, examples of which are discussed below, may be used to designate, from among the priority nodes, the particular priority node that is to be the first priority node to be evaluated. Then, a measured signal from the first priority node is compared to pass-fail criterion for the first priority node to ascertain whether the measured signal from the first priority node meets the pass-fail criterion for the first priority node. As noted above, the pass-fail criterion may be or include whether the measured signal from the first priority node matches, or falls within a desired tolerance of, the expected signal for the first priority node, the expected signal being the simulated signal within the circuit simulation data 103 that corresponds to the first priority node.

In configurations, automatically designating for verification the first priority node from the priority nodes includes designating a starting node of a pre-determined diagnostic tree as the first priority node. For example, the pre-determined diagnostic tree may establish a sequence of nodes to be tested, the sequence specifying the node to start with (the starting node) and an order of nodes to test after the starting node. In configurations the diagnostic tree may be generated using artificial intelligence, previously performed branch analysis of the circuit schematic data 101, or other methods, to identify an appropriate sequence of testing the circuit nodes to determine proper circuit operation. In configurations, the order of nodes to test may depend on the outcome of a test on an earlier node in the sequence of nodes, including whether the earlier node passed or failed its test.

Figure 4:
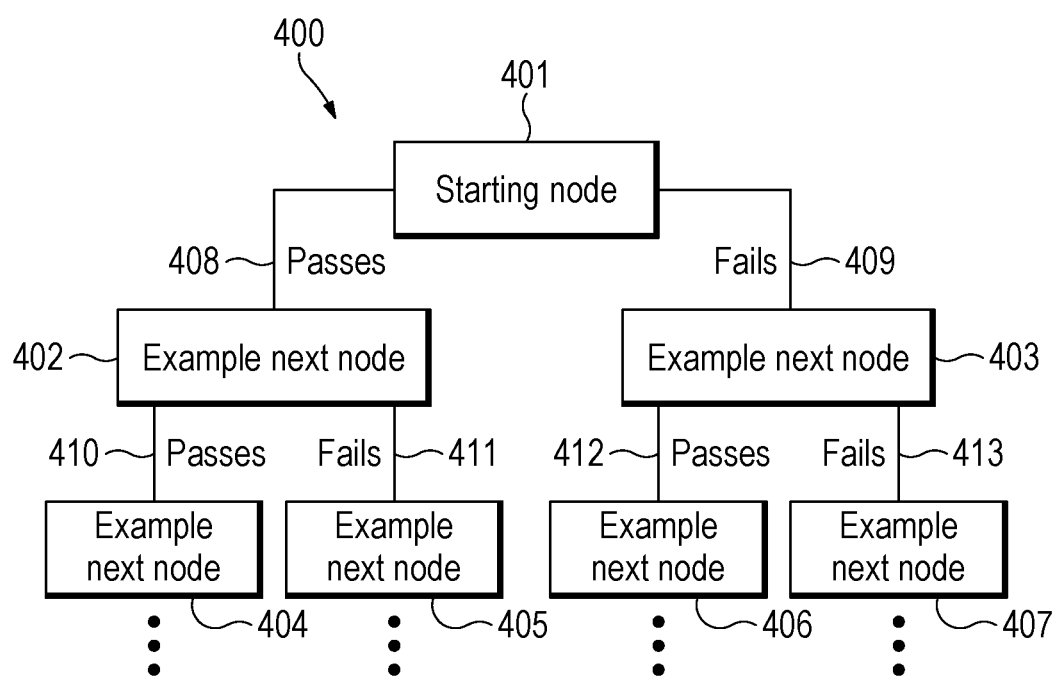
FIG. 4 illustrates an example of a decision tree, according to configurations.

FIG. 4 shows an example of a diagnostic tree used to illustrate the concept. As shown in FIG. 4, the pre-determined diagnostic tree 400 indicates which node to test next, depending on the outcome of a test of the prior node. For example, the starting node 401 is indicated near the top of FIG. 4. If the starting node 401 is tested and meets the pass-fail criterion for the starting node 401 (indicated as the "passes" path 408), the diagnostic tree 400 indicates that the node 402 is the next node to be tested. By contrast, if the starting node 401 is tested and does not meet the pass-fail criterion for the starting node 401 (indicated as the "fails" path 409), the diagnostic tree 400 indicates that the node 403 is the next node to be tested. This process may be repeated for each additional node.

Hence, as illustrated in FIG. 4, if the node 402 is tested and meets the pass-fail criterion for the node 402 (indicated as the "passes" path 410), the diagnostic tree 400 indicates that the node 404 is the next node to be tested. If, however, the node 402 is tested and does not meet the pass-fail criterion for the node 402 (indicated as the "fails" path 411), the diagnostic tree 400 indicates that the node 405 is the next node to be tested.

Similarly, as illustrated in FIG. 4, if the node 403 is tested and meets the pass-fail criterion for the node 403 (indicated as the "passes" path 412), the diagnostic tree 400 indicates that the node 406 is the next node to be tested. If, however, the node 403 is tested and does not meet the pass-fail criterion for the node 403 (indicated as the "fails" path 413), the diagnostic tree 400 indicates that the node 407 is the next node to be tested.

FIG. 4 illustrates just one example of a diagnostic tree, and other formats could be used. For example, the next node to be tested could be determined based on the identity of the prior node, including its location in the circuit, regardless of whether the prior node passed or failed its pass-fail criterion. In such cases, the diagnostic tree may simply be a list of nodes to be tested in sequence.

Returning to FIG. 3, in configurations, automatically designating for verification the first priority node from the priority nodes includes utilizing an artificial intelligence functionality 205 to determine a starting node and designating the starting node of the diagnostic tree as the first priority node. By way of example, priority may be based on the number of circuit elements that a node is connected to. For instance, a power supply will touch a large number of circuit elements and, for that reason, may get a higher priority than an amplifier output that only drives one other device. The artificial intelligence functionality 205 may also iteratively re-evaluate node priorities based on which nodes have passed and failed up to the current point in the analysis process.

In configurations, automatically designating for verification the first priority node from the priority nodes includes receiving, at a computer-aided analysis tool 202, circuit schematic data 101 and circuit simulation data 103.

A diagnostic tree may then be generated from the circuit schematic data 101 and the circuit simulation data 103. As noted above, in configurations the diagnostic tree may be generated using artificial intelligence, branch analysis, or other methods, to identify an appropriate sequence of testing circuit network nodes to determine proper circuit operation. After the diagnostic tree is created, the starting node of the diagnostic tree may then be designated as the first priority node.

In configurations, ascertaining whether the measured signal from the first priority node meets the pass-fail criterion for the first priority node includes obtaining a measured signal from the first priority node; obtaining circuit simulation data 103 from computer-aided analysis of the fabricated circuit 102, the circuit simulation data 103 including a simulated signal corresponding to the first priority node; comparing the measured signal from the first priority node with the simulated signal corresponding to the first priority node; classifying the measured signal from the first priority node as passing when the measured signal from the first priority node is within the pass-fail criterion for the first priority node, the pass-fail criterion for the first priority node being based on a maximum desired variance from the simulated signal corresponding to the first priority node; and classifying the measured signal from the first priority node as failing when the measured signal from the first priority node is outside of the pass-fail criterion for the first priority node.

In configurations, obtaining the measured signal from the first priority node may include using a probe coupled to a test-and-measurement instrument 203 to obtain the measured signal from the first priority node. In such configurations, the method 300 may further include providing a prompt to a human operator to position the probe coupled to the test-and-measurement instrument 203 to obtain the measured signal from the first priority node. The prompt may be, for example, a specific instruction to obtain a signal at a specific location. The prompt may further include the expected result of the measured signal. For example, the prompt may indicate that the signal should be a sinewave with a frequency of 100 kHz and an amplitude of 1 Vp-p. In configurations, the prompt to the human operator may be displayed on a screen or other display device, such as the display device 204 illustrated in FIG. 2.

In configurations using the probe coupled to the test-and-measurement instrument 203 to obtain the measured signal from the first priority node, the method 300 may further include causing an automated probing system 206 to position, without human intervention, the probe coupled to the test-and-measurement instrument 203 to obtain the measured signal from the first priority node. The prompt may include, for example, an identification of the first priority node.

In configurations, evaluating the first priority node further comprises displaying the comparison on a user interface, the comparison being the result of comparing the measured signal from the first priority node with the simulated signal corresponding to the first priority node. The user interface may be, for example, the display device 204 illustrated in FIG. 2.

In configurations, the method 300 may further include designating a succeeding node of the diagnostic tree as the second priority node. The succeeding node is later in the sequence of nodes than the first priority node. In configurations, the succeeding node is the next item in the sequence of nodes after the first priority node. For example, in configurations using a diagnostic tree, the succeeding node is the node identified by the diagnostic tree as being the next node to test after the first priority node.

When the measured signal from the first priority node meets the pass-fail criterion for the first priority node, the method 300 may further include evaluating 303 a second priority node by automatically designating for verification the second priority node from the priority nodes, and ascertaining whether a measured signal from the second priority node meets a pass-fail criterion for the second priority node. For example, processes may be used to designate, from among the priority nodes, the particular priority node that is to be the second priority node to be evaluated. Examples of such processes include the diagnostic tree (such as the diagnostic tree 400 in FIG. 4) and the artificial intelligence functionality 205 discussed above. Then, a measured signal from the second priority node is compared to pass-fail criterion for the second priority node to ascertain whether the measured signal from the second priority node meets the pass-fail criterion for the second priority node. As noted above, the pass-fail criterion may be or include whether the measured signal from the second priority node matches, or falls within a desired tolerance of, the expected signal for the second priority node, the expected signal being the simulated signal within the circuit simulation data 103 that corresponds to the second priority node.

In configurations, automatically designating for verification the second priority node from the priority nodes includes designating a next node of the pre-determined diagnostic tree as the second priority node.

In configurations, automatically designating for verification the second priority node from the priority nodes comprises utilizing the artificial intelligence functionality 205 to determine the next node to be tested and then designating the next node of the diagnostic tree as the second priority node.

In configurations, ascertaining whether the measured signal from the second priority node meets the pass-fail criterion for the second priority node includes obtaining a measured signal from the second priority node; obtaining circuit simulation data 103 from computer-aided analysis of the fabricated circuit 102, the circuit simulation data 103 including a simulated signal corresponding to the second priority node; comparing the measured signal from the second priority node with the simulated signal corresponding to the second priority node; classifying the measured signal from the second priority node as passing when the measured signal from the second priority node is within the pass-fail criterion for the second priority node, the pass-fail criterion for the second priority node being based on a maximum desired variance from the simulated signal corresponding to the second priority node; and classifying the measured signal from the second priority node as failing when the measured signal from the second priority node is outside of the pass-fail criterion for the second priority node.

In configurations, obtaining the measured signal from the second priority node includes using the probe coupled to the test-and-measurement instrument 203 to obtain the measured signal from the second priority node. In such configurations, the method 300 may further include providing a prompt to a human operator to position the probe coupled to the test-and-measurement instrument 203 to obtain the measured signal from the second priority node. The prompt may be, for example, as described above with respect to providing a prompt for the first priority node.

In configurations using the probe coupled to the test-and-measurement instrument 203 to obtain the measured signal from the second priority node, the method 300 may further include causing the automated probing system 206 to position the probe coupled to the test-and-measurement instrument 203 to obtain the measured signal from the second priority node. The prompt may be, for example, as described above with respect to providing a prompt for the first priority node.

In configurations, evaluating the second priority node further comprises displaying a comparison on the user interface, the comparison being the result of comparing the measured signal from the second priority node with the simulated signal corresponding to the second priority node. The user interface may be, for example, the display device 204 illustrated in FIG. 2.

When the measured signal from the first priority node does not meet the pass-fail criterion for the first priority node, the method 300 may further include evaluating 304 a first inferior node by automatically designating for verification the first inferior node from the inferior nodes, and ascertaining whether a measured signal from the first inferior node meets a pass-fail criterion for the first inferior node. The first inferior node may be on the same sub-portion of the fabricated circuit 102 as the first priority node. For example, processes may be used to designate, from among the inferior nodes on the same sub-portion of the fabricated circuit 102 as the first priority node, the particular inferior node that is to be the first inferior node to be evaluated. Examples of such processes include the diagnostic tree (such as the diagnostic tree 400 in FIG. 4) and the artificial intelligence functionality 205 discussed above. Then, a measured signal from the first inferior node is compared to pass-fail criterion for the first inferior node to ascertain whether the measured signal from the first inferior node meets the pass-fail criterion for the first inferior node. As noted above, the pass-fail criterion may be or include whether the measured signal from the first inferior node matches, or falls within a desired tolerance of, the expected signal for the first inferior node, the expected signal being the simulated signal within the circuit simulation data 103 that corresponds to the first inferior node.

In configurations, automatically designating for verification the first inferior node from the priority nodes includes designating the next node of the pre-determined diagnostic tree as the first inferior node.

In configurations, automatically designating for verification the first inferior node from the priority nodes comprises utilizing an artificial intelligence functionality 205 to determine a next node and designating the next node of the diagnostic tree as the first inferior node.

In configurations, ascertaining whether the measured signal from the first inferior node meets the pass-fail criterion for the first inferior node includes obtaining a measured signal from the first inferior node; obtaining circuit simulation data 103 from computer-aided analysis of the fabricated circuit 102, the circuit simulation data 103 including a simulated signal corresponding to the first inferior node; comparing the measured signal from the first inferior node with the simulated signal corresponding to the first inferior node; classifying the measured signal from the first inferior node as passing when the measured signal from the first inferior node is within the pass-fail criterion for the first inferior node, the pass-fail criterion for the first inferior node being based on a maximum desired variance from the simulated signal corresponding to the first inferior node; and classifying the measured signal from the first inferior node as failing when the measured signal from the first inferior node is outside of the pass-fail criterion for the first inferior node.

In configurations, obtaining the measured signal from the first inferior node includes using the probe coupled to the test-and-measurement instrument 203 to obtain the measured signal from the first inferior node. In such configurations, the method 300 may further include providing a prompt to a human operator to position the probe coupled to the test-and-measurement instrument 203 to obtain the measured signal from the first inferior node. The prompt may be, for example, as described above with respect to providing a prompt for the first priority node.

In configurations using the probe coupled to the test-and-measurement instrument 203 to obtain the measured signal from the first inferior node, the method 300 may further include causing the automated probing system 206 to position the probe coupled to the test-and-measurement instrument 203 to obtain the measured signal from the first inferior node. The prompt may be, for example, as described above with respect to providing a prompt for the first priority node.

In configurations, evaluating the first inferior node further comprises displaying a comparison on a user interface, the comparison being the result of comparing the measured signal from the first inferior node with the simulated signal corresponding to the first inferior node. The user interface may be, for example, the display device 204 illustrated in FIG. 2.

When the measured signal from the second priority node meets the pass-fail criterion for the second priority node, the method 300 may further include evaluating 305 a third priority node by automatically designating for verification the third priority node from the priority nodes, and ascertaining whether a measured signal from the third priority node meets a pass-fail criterion for the third priority node. For example, processes may be used to designate, from among the priority nodes, the particular priority node that is to be the third priority node to be evaluated. Examples of such processes include the diagnostic tree (such as the diagnostic tree 400 in FIG. 4) and the artificial intelligence functionality 205 discussed above. Then, a measured signal from the third priority node is compared to pass-fail criterion for the third priority node to ascertain whether the measured signal from the third priority node meets the pass-fail criterion for the third priority node. As noted above, the pass-fail criterion may be or include whether the measured signal from the third priority node matches, or falls within a desired tolerance of, the expected signal for the third priority node, the expected signal being the simulated signal within the circuit simulation data 103 that corresponds to the third priority node.

When the measured signal from the second priority node does not meet the pass-fail criterion for the second priority node, the method 300 may further include evaluating 306 a second inferior node by automatically designating for verification the second inferior node from the inferior nodes, and ascertaining whether a measured signal from the second inferior node meets a pass-fail criterion for the second inferior node. The second inferior node may be on the same sub-portion of the fabricated circuit 102 as the second priority node.

In configurations, the method 300 may further include evaluating each priority node when a preceding priority node meets a pass-fail criterion for the preceding priority node until each priority node has been evaluated. Accordingly, every priority node will be evaluated as long as every preceding priority node meets its respective pass-fail criterion.

In configurations, the method 300 may further include evaluating each inferior node of a respective priority node when a preceding inferior node meets a pass-fail criterion for the preceding inferior node until each inferior node of the respective priority node has been evaluated.

Figure 5:
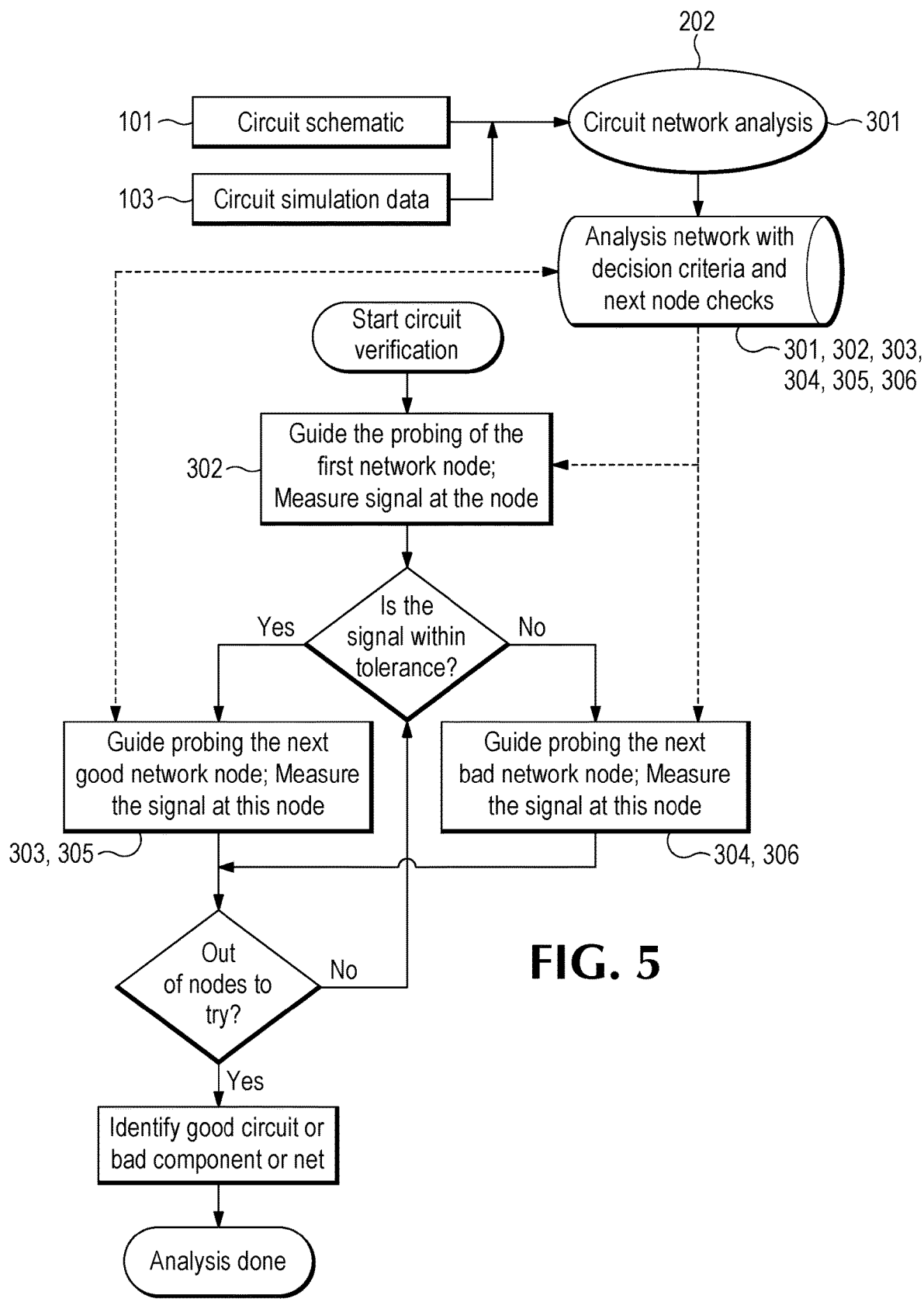
FIG. 5 illustrates an example data flow and process for a batched analysis, according to an example configuration.
Figure 6:
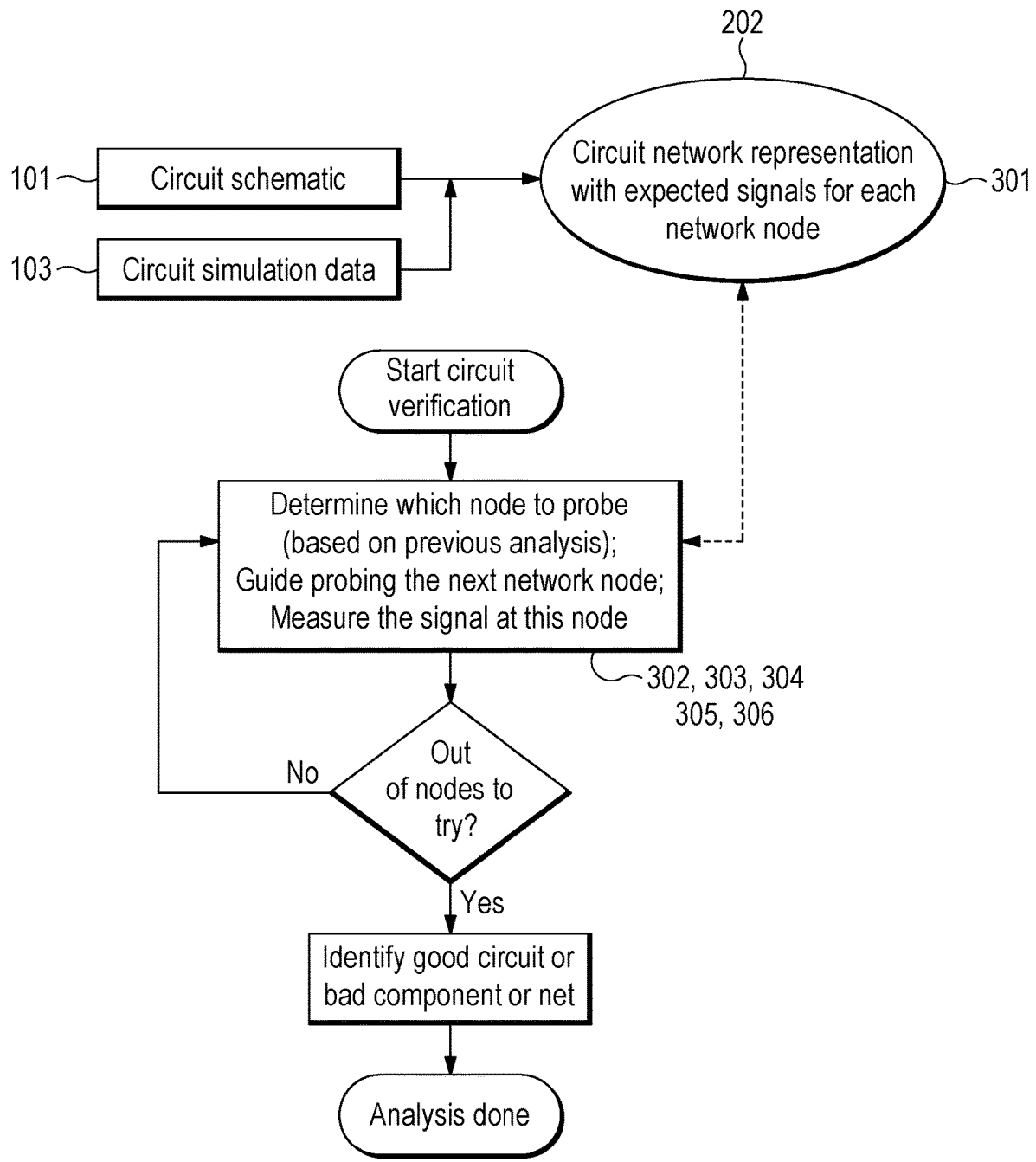
FIG. 6 illustrates an example data flow and process for an iterative analysis, according to an example configuration.

FIG. 5 illustrates an example data flow and process for a batched analysis, according to an example configuration. FIG. 6 illustrates an example data flow and process for an iterative analysis, according to an example configuration. The reference numbers identifying the functional blocks in FIGS. 5 and 6 correspond to features and processes discussed above. Note that some of the processes discussed above may correspond to more than one functional block in FIGS. 5 and 6.

In configurations, a processor, such as the processor 201 depicted in FIG. 2, may be configured to interact with the computer-aided analysis tool 202, the test-and-measurement instrument 203, the display device 204, the artificial intelligence functionality 205, and the automated probing system 206. In configurations, the processor 201 may be configured to perform one or more of the operations illustrated in FIG. 3, 5, or 6, or otherwise described in this disclosure.

Furthermore, aspects may operate on a particularly created hardware, on firmware, digital signal processors, or on a specially programmed general-purpose computer including a processor operating according to programmed instructions. The terms "controller" or "processor" as used herein are intended to include microprocessors, microcomputers, ASICs, and dedicated hardware controllers. One or more aspects may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, RAM, etc. As will be appreciated by one of skill in the art, the functionality of the program modules may be combined or distributed as desired in various configurations. In addition, the functionality may be embodied in whole or in part in firmware or hardware equivalents such as integrated circuits, field programmable gate arrays (FPGA), and the like. Particular data structures may be used to more effectively implement one or more aspects of the disclosed systems and methods, and such data structures are contemplated within the scope of computer executable instructions and computer-usable data described herein.

EXAMPLES

Illustrative examples of the disclosed technologies are provided below. A particular configuration of the technologies may include one or more, and any combination of, the examples described below.

Example 1 includes a method for automated assisting of circuit validation, the method comprising: categorizing one or more nodes of a fabricated circuit as being a priority node and one or more nodes of the fabricated circuit as being an inferior node, each inferior node being on a same sub-portion of the fabricated circuit as at least one of the priority nodes; evaluating a first priority node by automatically designating for verification the first priority node from the priority nodes, and ascertaining whether a measured signal from the first priority node meets a pass-fail criterion for the first priority node; evaluating, when the measured signal from the first priority node meets the pass-fail criterion for the first priority node, a second priority node by automatically designating for verification the second priority node from the priority nodes, and ascertaining whether a measured signal from the second priority node meets a pass-fail criterion for the second priority node; and evaluating, when the measured signal from the first priority node does not meet the pass-fail criterion for the first priority node, a first inferior node, the first inferior node being on the same sub-portion of the fabricated circuit as the first priority node, by automatically designating for verification the first inferior node from the inferior nodes, and ascertaining whether a measured signal from the first inferior node meets a pass-fail criterion for the first inferior node.

Example 2 includes the method of Example 1, further comprising: evaluating, when the measured signal from the second priority node meets the pass-fail criterion for the second priority node, a third priority node by automatically designating for verification the third priority node from the priority nodes, and ascertaining whether a measured signal from the third priority node meets a pass-fail criterion for the third priority node; and evaluating, when the measured signal from the second priority node does not meet the pass-fail criterion for the second priority node, a second inferior node, the second inferior node being on the same sub-portion of the fabricated circuit as the second priority node, by automatically designating for verification the second inferior node from the inferior nodes, and ascertaining whether a measured signal from the second inferior node meets a pass-fail criterion for the second inferior node.

Example 3 includes the method of any of Examples 1-2, further comprising evaluating a succeeding priority node when a preceding priority node meets a pass-fail criterion for the preceding priority node until each priority node has been evaluated.

Example 4 includes the method of any of Examples 1-3, further comprising evaluating a succeeding inferior node of a respective priority node when a preceding inferior node meets a pass-fail criterion for the preceding inferior node until each inferior node of the respective priority node has been evaluated.

Example 5 includes the method of any of Examples 1-4, in which automatically designating for verification the first priority node from the priority nodes includes designating a starting node of a pre-determined diagnostic tree as the first priority node.

Example 6 includes the method of any of Examples 1-5, in which automatically designating for verification the first priority node from the priority nodes includes utilizing an artificial intelligence functionality to determine a starting node and designating the starting node as the first priority node.

Example 7 includes the method of any of Examples 1-6, in which automatically designating for verification the first priority node from the priority nodes includes: receiving, at a computer-aided analysis tool, circuit schematic data and circuit simulation data; generating, from the circuit schematic data and the circuit simulation data, a diagnostic tree establishing a sequence of nodes; and designating a starting node in the sequence of nodes of the diagnostic tree as the first priority node.

Example 8 includes the method of Example 7, further comprising designating a succeeding node of the diagnostic tree as the second priority node, the succeeding node being later in the sequence of nodes than the first priority node.

Example 9 includes the method of any of Examples 1-8, in which ascertaining whether the measured signal from the respective first or second priority node meets the pass-fail criterion for the respective first or second priority node comprises: obtaining a measured signal from the respective priority node; obtaining circuit simulation data from computer-aided analysis of the fabricated circuit, the circuit simulation data including a simulated signal corresponding to the respective priority node; comparing the measured signal from the respective priority node with the simulated signal corresponding to the respective priority node; classifying the measured signal from the respective priority node as passing when the measured signal from the respective priority node is within the pass-fail criterion for the respective priority node, the pass-fail criterion for the respective priority node being based on a maximum desired variance from the simulated signal corresponding to the respective priority node; and classifying the measured signal from the respective priority node as failing when the measured signal from the respective priority node is outside of the pass-fail criterion for the respective priority node.

Example 10 includes the method of Example 9, in which obtaining the measured signal from the respective priority node comprises at least one of: providing a prompt to a human operator to position the probe coupled to the test-and-measurement instrument to obtain the measured signal from the respective priority node; and causing an automated probing system to position the probe coupled to the test-and-measurement instrument to obtain the measured signal from the respective priority node.

Example 11 includes the method of any of Examples 9-10, in which comparing the measured signal from the respective priority node with the simulated signal corresponding to the respective priority node results in a comparison, and in which evaluating the respective priority node further comprises displaying the comparison on a user interface.

Example 12 includes the method of any of Examples 1-11, in which automatically designating for verification the second priority node from the priority nodes includes designating a next node of a pre-determined diagnostic tree as the second priority node.

Example 13 includes the method of any of Examples 1-12, in which automatically designating for verification the second priority node from the priority nodes comprises utilizing an artificial intelligence functionality to determine a next node and designating the next node as the second priority node.

Example 14 includes the method of any of Examples 1-13, in which automatically designating for verification the first inferior node from the priority nodes includes designating a next node of a pre-determined diagnostic tree as the first inferior node.

Example 15 includes the method of any of Examples 1-14, in which automatically designating for verification the first inferior node from the priority nodes comprises utilizing an artificial intelligence functionality to determine a next node and designating the next node as the first inferior node.

Example 16 includes a non-transitory computer-readable medium having computer-executable instructions stored thereon that, in response to execution by a computing device, cause the computing device to perform operations, the operations comprising: evaluating a first priority node by automatically designating for verification the first priority node from a group of priority nodes, and ascertaining whether a measured signal from the first priority node meets a pass-fail criterion for the first priority node; evaluating, when the measured signal from the first priority node meets the pass-fail criterion for the first priority node, a second priority node by automatically designating for verification the second priority node from the group of priority nodes, and ascertaining whether a measured signal from the second priority node meets a pass-fail criterion for the second priority node; and evaluating, when the measured signal from the first priority node does not meet the pass-fail criterion for the first priority node, a first inferior node, the first inferior node being on the same sub-portion of the fabricated circuit as the first priority node, by automatically designating for verification the first inferior node from a group of inferior nodes, and ascertaining whether a measured signal from the first inferior node meets a pass-fail criterion for the first inferior node.

Example 17 includes the non-transitory computer-readable medium of Example 16, the operations further comprising: evaluating, when the measured signal from the second priority node meets the pass-fail criterion for the second priority node, a third priority node by automatically designating for verification the third priority node from the group of priority nodes, and ascertaining whether a measured signal from the third priority node meets a pass-fail criterion for the third priority node; and evaluating, when the measured signal from the second priority node does not meet the pass-fail criterion for the second priority node, a second inferior node, the second inferior node being on the same sub-portion of the fabricated circuit as the second priority node, by automatically designating for verification the second inferior node from the group of inferior nodes, and ascertaining whether a measured signal from the second inferior node meets a pass-fail criterion for the second inferior node.

Example 18 includes the non-transitory computer-readable medium of any of Examples 16-17, the operations further comprising evaluating a succeeding priority node when a preceding priority node meets a pass-fail criterion for the preceding priority node until each priority node has been evaluated.

Example 19 includes the non-transitory computer-readable medium of any of Examples 16-18, the operations further comprising evaluating a succeeding inferior node of a respective priority node when a preceding inferior node meets a pass-fail criterion for the preceding inferior node until each inferior node of the respective priority node has been evaluated.

Example 20 includes the non-transitory computer-readable medium of any of Examples 16-19, in which automatically designating for verification the first priority node from the group of priority nodes includes designating a starting node of a pre-determined diagnostic tree as the first priority node.

Example 21 includes the non-transitory computer-readable medium of any of Examples 16-20, in which automatically designating for verification the first priority node from the priority nodes includes utilizing an artificial intelligence functionality to determine a starting node and designating the starting node as the first priority node.

Example 22 includes the non-transitory computer-readable medium of any of Examples 16-21, in which automatically designating for verification the first priority node from the priority nodes includes: receiving, at a computer-aided analysis tool, circuit schematic data and circuit simulation data; generating, from the circuit schematic data and the circuit simulation data, a diagnostic tree establishing a sequence of nodes; and designating a starting node in the sequence of nodes of the diagnostic tree as the first priority node.

Example 23 includes the non-transitory computer-readable medium of Example 22, the operations further comprising designating a succeeding node of the diagnostic tree as the second priority node, the succeeding node being later in the sequence of nodes than the first priority node.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Although specific example configurations have been described for purposes of illustration, it will be understood that various modifications may be made without departing from the spirit and scope of the disclosure.

I claim:

1. A method for automated assisting of circuit validation, the method comprising:
    categorizing one or more nodes of a fabricated circuit as being a priority node and one or more nodes of the fabricated circuit as being an inferior node, each inferior node being on a same sub-portion of the fabricated circuit as at least one of the priority nodes;
    evaluating a first priority node by automatically designating for verification the first priority node from the priority nodes, and ascertaining whether a measured signal from the first priority node meets a pass-fail criterion for the first priority node;
    evaluating, when the measured signal from the first priority node meets the pass-fail criterion for the first priority node, a second priority node by automatically designating for verification the second priority node from the priority nodes, and ascertaining whether a measured signal from the second priority node meets a pass-fail criterion for the second priority node; and
    evaluating, when the measured signal from the first priority node does not meet the pass-fail criterion for the first priority node, a first inferior node, the first inferior node being on the same sub-portion of the fabricated circuit as the first priority node, by automatically designating for verification the first inferior node from the inferior nodes, and ascertaining whether a measured signal from the first inferior node meets a pass-fail criterion for the first inferior node.

2. The method of claim 1, further comprising:
    evaluating, when the measured signal from the second priority node meets the pass-fail criterion for the second priority node, a third priority node by automatically designating for verification the third priority node from the priority nodes, and ascertaining whether a measured signal from the third priority node meets a pass-fail criterion for the third priority node; and
    evaluating, when the measured signal from the second priority node does not meet the pass-fail criterion for the second priority node, a second inferior node, the second inferior node being on the same sub-portion of the fabricated circuit as the second priority node, by automatically designating for verification the second inferior node from the inferior nodes, and ascertaining whether a measured signal from the second inferior node meets a pass-fail criterion for the second inferior node.

3. The method of claim 1, further comprising evaluating a succeeding priority node when a preceding priority node meets a pass-fail criterion for the preceding priority node until each priority node has been evaluated.

4. The method of claim 1, further comprising evaluating a succeeding inferior node of a respective priority node when a preceding inferior node meets a pass-fail criterion for the preceding inferior node until each inferior node of the respective priority node has been evaluated.

5. The method of claim 1, in which automatically designating for verification the first priority node from the priority nodes includes designating a starting node of a pre-determined diagnostic tree as the first priority node.

6. The method of claim 1, in which automatically designating for verification the first priority node from the priority nodes includes utilizing an artificial intelligence functionality to determine a starting node and designating the starting node as the first priority node.

7. The method of claim 1, in which automatically designating for verification the first priority node from the priority nodes includes:
    receiving, at a computer-aided analysis tool, circuit schematic data and circuit simulation data;
    generating, from the circuit schematic data and the circuit simulation data, a diagnostic tree establishing a sequence of nodes; and
    designating a starting node in the sequence of nodes of the diagnostic tree as the first priority node.

8. The method of claim 7, further comprising designating a succeeding node of the diagnostic tree as the second priority node, the succeeding node being later in the sequence of nodes than the first priority node.

9. The method of claim 1, in which ascertaining whether the measured signal from the respective first or second priority node meets the pass-fail criterion for the respective first or second priority node comprises:
    obtaining a measured signal from the respective priority node;
    obtaining circuit simulation data from computer-aided analysis of the fabricated circuit, the circuit simulation data including a simulated signal corresponding to the respective priority node;
    comparing the measured signal from the respective priority node with the simulated signal corresponding to the respective priority node;
    classifying the measured signal from the respective priority node as passing when the measured signal from the respective priority node is within the pass-fail criterion for the respective priority node, the pass-fail criterion for the respective priority node being based on a maximum desired variance from the simulated signal corresponding to the respective priority node; and
    classifying the measured signal from the respective priority node as failing when the measured signal from the respective priority node is outside of the pass-fail criterion for the respective priority node.

10. The method of claim 9, in which obtaining the measured signal from the respective priority node comprises at least one of:
- providing a prompt to a human operator to position the probe coupled to the test-and-measurement instrument to obtain the measured signal from the respective priority node; and
- causing an automated probing system to position the probe coupled to the test-and-measurement instrument to obtain the measured signal from the respective priority node.

11. The method of claim 9, in which comparing the measured signal from the respective priority node with the simulated signal corresponding to the respective priority node results in a comparison, and in which evaluating the respective priority node further comprises displaying the comparison on a user interface.

12. The method of claim 1, in which automatically designating for verification the second priority node from the priority nodes includes designating a next node of a pre-determined diagnostic tree as the second priority node.

13. The method of claim 1, in which automatically designating for verification the second priority node from the priority nodes comprises utilizing an artificial intelligence functionality to determine a next node and designating the next node as the second priority node.

14. The method of claim 1, in which automatically designating for verification the first inferior node from the priority nodes includes designating a next node of a pre-determined diagnostic tree as the first inferior node.

15. The method of claim 1, in which automatically designating for verification the first inferior node from the priority nodes comprises utilizing an artificial intelligence functionality to determine a next node and designating the next node as the first inferior node.

16. A non-transitory computer-readable medium having computer-executable instructions stored thereon that, in response to execution by a computing device, cause the computing device to perform operations, the operations comprising:
- evaluating a first priority node by automatically designating for verification the first priority node from a group of priority nodes, and ascertaining whether a measured signal from the first priority node meets a pass-fail criterion for the first priority node;
- evaluating, when the measured signal from the first priority node meets the pass-fail criterion for the first priority node, a second priority node by automatically designating for verification the second priority node from the group of priority nodes, and ascertaining whether a measured signal from the second priority node meets a pass-fail criterion for the second priority node; and
- evaluating, when the measured signal from the first priority node does not meet the pass-fail criterion for the first priority node, a first inferior node, the first inferior node being on the same sub-portion of the fabricated circuit as the first priority node, by automatically designating for verification the first inferior node from a group of inferior nodes, and ascertaining whether a measured signal from the first inferior node meets a pass-fail criterion for the first inferior node.

17. The non-transitory computer-readable medium of claim 16, the operations further comprising:
- evaluating, when the measured signal from the second priority node meets the pass-fail criterion for the second priority node, a third priority node by automatically designating for verification the third priority node from the group of priority nodes, and ascertaining whether a measured signal from the third priority node meets a pass-fail criterion for the third priority node; and
- evaluating, when the measured signal from the second priority node does not meet the pass-fail criterion for the second priority node, a second inferior node, the second inferior node being on the same sub-portion of the fabricated circuit as the second priority node, by automatically designating for verification the second inferior node from the group of inferior nodes, and ascertaining whether a measured signal from the second inferior node meets a pass-fail criterion for the second inferior node.

18. The non-transitory computer-readable medium of claim 16, the operations further comprising evaluating a succeeding priority node when a preceding priority node meets a pass-fail criterion for the preceding priority node until each priority node has been evaluated.

19. The non-transitory computer-readable medium of claim 16, the operations further comprising evaluating a succeeding inferior node of a respective priority node when a preceding inferior node meets a pass-fail criterion for the preceding inferior node until each inferior node of the respective priority node has been evaluated.

20. The non-transitory computer-readable medium of claim 16, in which automatically designating for verification the first priority node from the group of priority nodes includes designating a starting node of a pre-determined diagnostic tree as the first priority node.

21. The non-transitory computer-readable medium of claim 16, in which automatically designating for verification the first priority node from the priority nodes includes utilizing an artificial intelligence functionality to determine a starting node and designating the starting node as the first priority node.

22. The non-transitory computer-readable medium of claim 16, in which automatically designating for verification the first priority node from the priority nodes includes:
- receiving, at a computer-aided analysis tool, circuit schematic data and circuit simulation data;
- generating, from the circuit schematic data and the circuit simulation data, a diagnostic tree establishing a sequence of nodes; and
- designating a starting node in the sequence of nodes of the diagnostic tree as the first priority node.

23. The non-transitory computer-readable medium of claim 22, the operations further comprising designating a succeeding node of the diagnostic tree as the second priority node, the succeeding node being later in the sequence of nodes than the first priority node.

* * * * *

UNITED STATES PATENT AND TRADEMARK OFFICE
CERTIFICATE OF CORRECTION

PATENT NO. : 11,520,966 B2  
APPLICATION NO. : 17/370976  
DATED : December 6, 2022  
INVENTOR(S) : David Everett Burgess It is certified that error appears in the above-identified patent and that said Letters Patent is hereby corrected as shown below:

In the Specification

Column 7, Line 38, "priority" should read --inferior--; Line 42, "priority" should read --inferior--.

Column 11, Line 46, "priority" should read --inferior--; Line 51, "priority" should read --inferior--.

In the Claims

Column 15, Line 29 Claim 14, "priority" should read --inferior--; Line 33 Claim 15, "priority" should read --inferior--.

Signed and Sealed this  
Tenth Day of October, 2023

Katherine Kelly Vidal  
*Director of the United States Patent and Trademark Office*